W. M. MEACHAM.
APPARATUS FOR PREVENTING SALT WATER FROM WORKING UP STREAMS.
APPLICATION FILED FEB. 16, 1915.
1,173,367.
Patented Feb. 29, 1916.
2 SHEETS—SHEET 1.
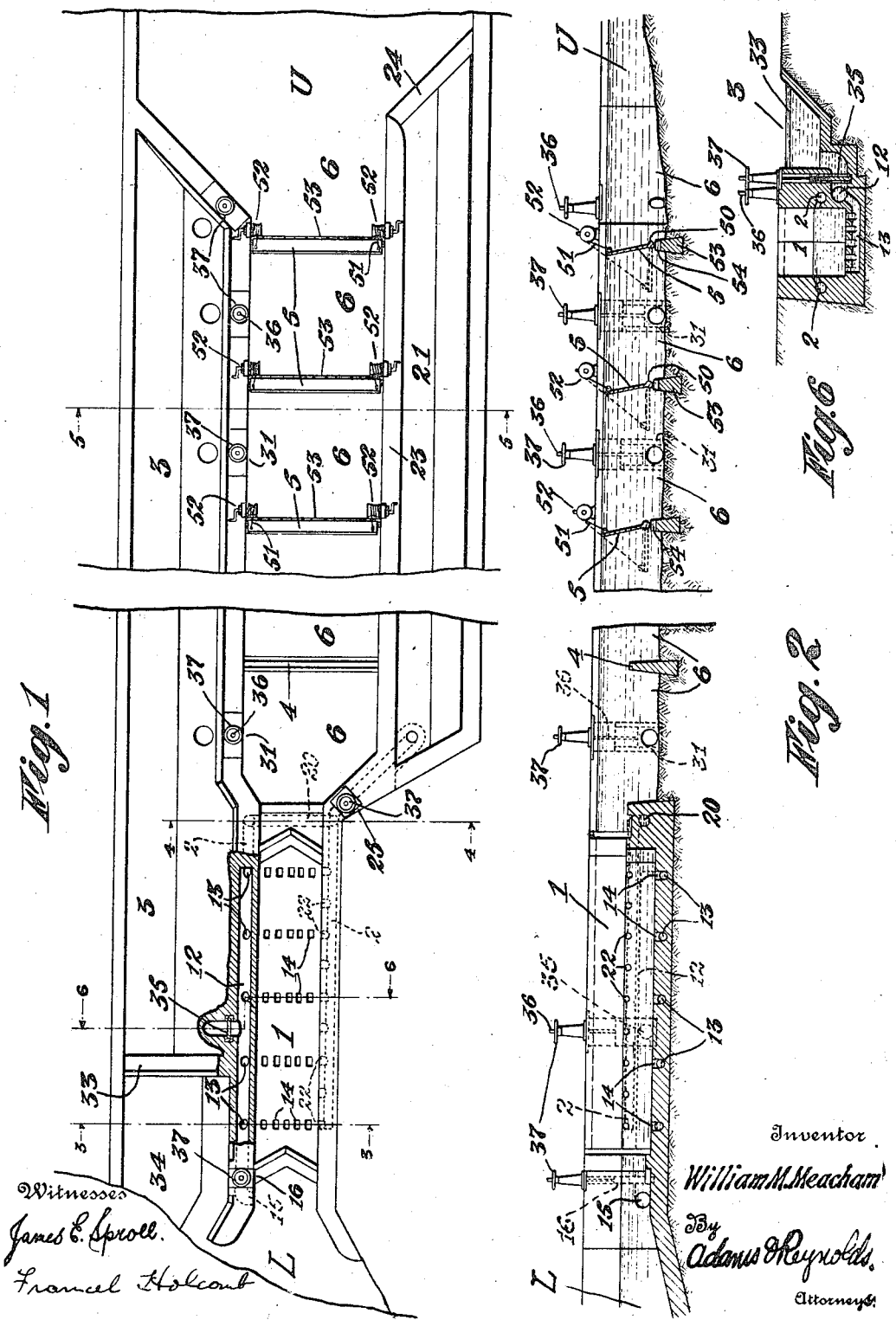
Inventor
William M. Meacham
By
Adams & Reynolds
Attorneys
Witnesses
James E. Sproll
Francel Holcomb W. M. MEACHAM.
APPARATUS FOR PREVENTING SALT WATER FROM WORKING UP STREAMS.
APPLICATION FILED FEB. 16, 1915.
1,173,367.
Patented Feb. 29, 1916.
2 SHEETS—SHEET 2.
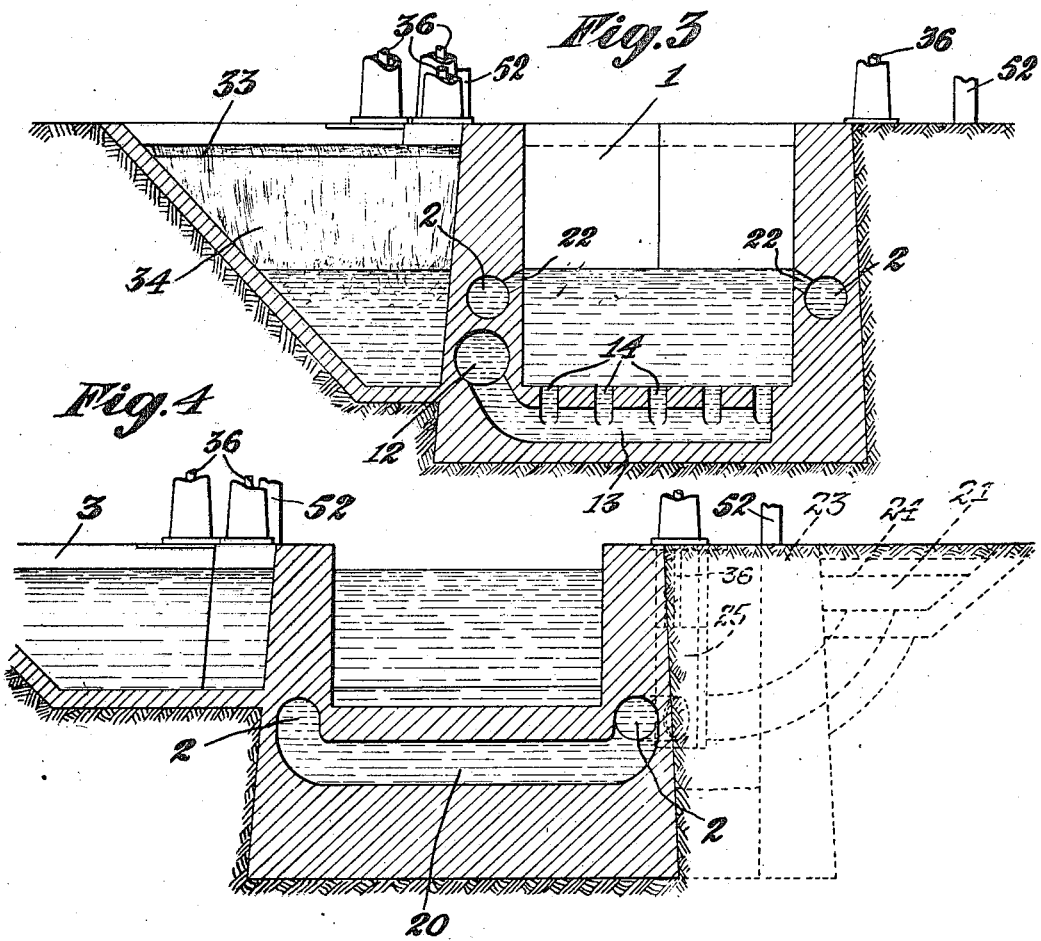
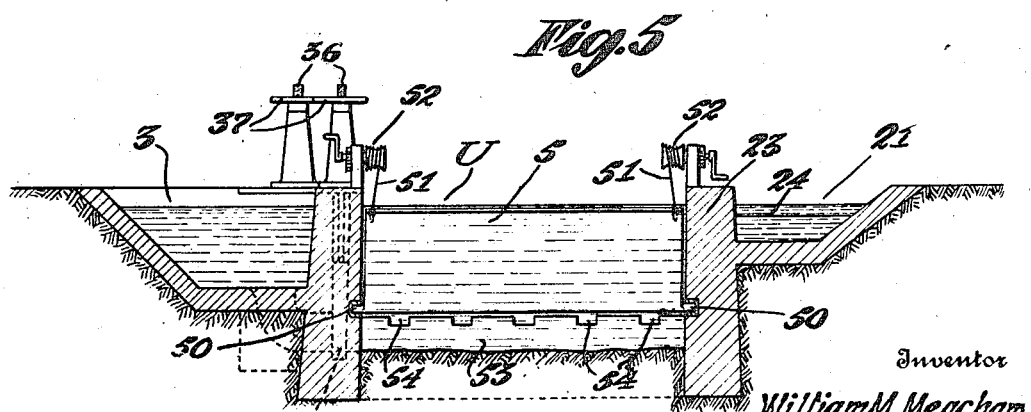
Inventor
William M. Meacham
Witnesses
James E. Sproll.
Frank E. Holcomb
By Adams & Reynolds
Attorneys

UNITED STATES PATENT OFFICE.

WILLIAM M. MEACHAM, OF SEATTLE, WASHINGTON.

APPARATUS FOR PREVENTING SALT WATER FROM WORKING UP STREAMS.

1,173,367.   Specification of Letters Patent.   Patented Feb. 29, 1916.

Application filed February 16, 1915. Serial No. 8,477.

*To all whom it may concern:*

Be it known that I, WILLIAM M. MEACHAM, a citizen of the United States of America, and a resident of the city of Seattle, in the county of King and State of Washington, have invented certain new and useful Improvements in Apparatus for Preventing Salt Water from Working Up Streams, of which the following is a specification.

My invention relates to means for preventing the upward flow of salt water in lock controlled canals, harbors and waterways.

The object of my invention is to prevent bodies of fresh water which are in lock communication with bodies of salt water from becoming contaminated by an upward flow of the salt water.

The particular features of which my invention consists will be hereinafter disclosed and particularly pointed out in the claims.

In the accompanying drawing I have shown my invention in the form of apparatus which is now preferred by me and will particularly set forth the method as also now preferred by me.

Figure 1 is a plan view showing a canal lock having apparatus applied thereto for carrying out my invention. Fig. 2 is a longitudinal sectional elevation of the same. Fig. 3 is a cross sectional elevation on the line 3, 3 of Fig. 1. Fig. 4 is a cross sectional elevation on the line 4, 4, of Fig. 1. Fig. 5 is a cross sectional elevation on the line 5, 5, of Fig. 1. Fig. 6 is a cross section on the line 6, 6, of Fig. 1.

It has long been known that salt water will work up a tidal river for considerable distances, provided the current and flow conditions in such river are favorable. That is, with a sluggish flow and deep water, this is more pronounced than where the current is rapid or the depth shallow.

This effect, that is, the upward flow of salt water, has also been found to occur where a lock, or locks, are employed to connect fresh and salt water and it is the object of my invention to prevent such saline impregnation of a body of fresh water which is thus connected with salt water.

In the drawings I have shown the mechanism of a lock and the manner in which I would adapt my invention thereto.

Where fresh water flows into salt water, there is a strong tendency for the fresh water to spread as a surface layer, unmixed with the salt water, and to maintain this condition for a considerable time, should nothing occur to mechanically mix the two. This is due, in large part, to the fact that the fresh water is of lighter specific gravity than the salt water, and sometimes also to the fact that the fresh water is warmer than the salt, this further reducing its specific gravity. Because of this difference in specific gravity of the fresh and the salt water, there is a tendency to establish an upstream current of the salt water along the bed of the stream, this causing saline contamination to exist at the bottom, a considerable distance above the point where saltiness is indicated in the surface water. If the flow of the stream is sluggish, or if the depth in considerable, this upward working tendency of the salt water is more manifest than where the current is rapid, or the depth slight. In the latter event the downward flowing current of fresh water will occupy the entire cross section of the stream and prevent any upward current along the stream bottom.

While in practice the action of ships' propellers, as well as wind and waves, will tend to cause a diffusion of the salty water throughout the entire mass, this will in no wise interfere with the final advance of the salt water up the stream. It will therefore be evident that if, in a lock controlled channel, one or more places in the course of said channel, above the lock, are of such reduced cross section that there is, at these places, at all times, a downward flowing current of sufficient velocity, no upward flowing current resulting from saline contamination through the said lock, can pass these points. Also if, either separate from or in conjunction with this, means are provided whereby the surface layers of the stream are stopped and all the flow is concentrated along the bottom, or the discharge water is all, or largely, drawn from the lower layers, then whatever salty water may have succeeded in making progress up the stream, will be drawn off and discharged down stream.

Referring to the mechanism shown in illustration of my invention, 1 represents a lock chamber, in connection with which is employed an emptying or water discharging means, which may consist of a conduit 12, extending lengthwise of the lock chamber and connecting with a plurality of transverse conduits 13 which extend beneath the floor of the lock chamber and communicate with said chamber, as by openings 14. This discharge mechanism is controlled, as by gates or valves located near the lower end of the conduit, as at 16 and by the gate 35.

Located above the level of the discharge conduit 12, preferably at each side the lock chamber, are filling or water-supplying conduits 2, these being connected with the lock chamber by a series of openings 22, which discharge fresh water, at the top of the low water level of the lock and give the said fresh water a slight upward direction, thereby causing the fresh water to flow to and remain upon the surface of the salt water and minimizing the tendency to stir up the lower or salty water and resulting in a comparative stratification, the denser or salt water tending to remain at the bottom and the fresh water at the top.

The two conduits 2 at opposite sides of the lock chamber are connected, as by a conduit 20, which passes under the channel. They are both supplied from such a source and in such manner, as will deliver as fresh water as possible. As herein shown, these conduits are supplied from a channel 21, which extends some distance upstream from the lock and is separated from the main channel of the canal or stream, as by a wall 23. A pipe or other inclosed conductor may be substituted for this channel. At its upper end it should draw its water from the surface layers, as over a spill-way or weir 24. This would therefore be the water of lightest specific gravity, or the freshest.

The manner in which salt water has heretofore progressed upstream through a lock, under the usual conditions, is as follows: The lower level, L, is the salt water level, while the upper level, U, is the fresh water level. When a boat entered the lock from the lower, or salt water level, the salt water entered, filling the lock chamber to the level of this lower body. The lock was then closed and the chamber further filled with fresh water from the upper body. This mixed with the salt water already in the chamber. When the boat emerges from the upper end of the lock, a current was set up which somewhat mixed the salty water within the lock with the fresh water outside the lock; furthermore, the salty water being heavier than the fresh, there was a tendency for the salty water to flow out, down to the level of the upper lock sill, being replaced by fresh water. In this way a quantity of salty water was discharged into the upper level at each operation of the lock, and this continued until the upper body became quite salty. My invention, however, remedies this action as follows: When the lock has been filled to the higher level the discharge gate 16 is opened, the fresh water filling supply being left open, and the heavier water is thereby drawn off from the bottom of the chamber and replaced by the fresh water entering from above, at which time the said discharge gate is closed and the upper lock gate opened for passage of the ship. The valve 35 connecting the discharge conduit with the waste channel 3, is then opened and the heavier strata at the bottom of the lock drawn off over the spillway. By this means the saline impregnation of the water within the lock will be very much reduced and could be entirely eliminated if time of operation was no consideration and fresh water supply not limited.

For practical purposes, however, the lock would have to be opened before it had become entirely freshened and at times, possibly, before it had been at all freshened, except to the extent of the dilution resulting from the fresh water filling necessary to raise boat to the upper level. In this event a more or less salty impregnation will be communicated to the water in the upper body. To counteract this action I provide means whereby the heavier salt water will be trapped, or held against working farther upstream, other means whereby waste discharge from the upper canal will be drawn from the lower layers of the water thus trapped, thereby providing for the discharge of the said salty water, and other means, either in conjunction with or separated from the pockets or sumps, whereby the flow channel may be restricted so as to produce, at a particular point, a velocity sufficient to prevent any further upflow of the salty water. The first of the means referred to for checking and holding this salty water, is to provide one or more pockets, or sumps 6, in the channel above the lock. By the term " sump " as herein used, is meant a depression which extends well below the bottom level of the communicating surrounding areas. These preferably extend a considerable distance upstream and, where practicable, their bottoms extend, well below the level of the bottom of the channel and below the level of the upstream lock sill. Each of these pockets or sumps is separated from the others by a wall or partition 4, the upper edge of which is of a height to allow traffic to pass freely over it. These walls act as baffle plates to retard the flow. These pockets or sumps catch and hold the heavier, salty water, and this is drawn off through gates 31, which control openings into a waste channel pipe, tunnel or other conductor, 3, said gates being located at the lowermost level of the water in these pockets 6, and connected, as by shafts 36, with operating mechanism, herein shown as wheels 37, which are located conveniently above the surface. By suitably controlling these gates, either remotely or directly, simultaneously or otherwise, the discharge water may be drawn from any one or more of the pockets or sumps 6. The waste channel 3, may be provided with a waste weir or spillway 33, over which the water may flow into a pool or channel 34 which connects freely with the lower canal level, thereby automatically discharging the salty water. Thus by suitable manipulation of the mechanism herein shown, or of some equivalent mechanism, the operation of the locks may be made to free, or to assist in freeing, the upper canal or body, of any salty water which may enter it through the locks. Summed up in a few words, this means consists of drawing the spilled or discharged water as fully as possible from the lowermost layers of water in the upper body, filling the lock from the uppermost layers of water in the said upper body and discharging the lock by drawing from its lowermost level. To further control any salt water upflow, above said pockets, I may restrict the available area of the channel by placing therein an adjustable obstruction, as a gate 5, which is hinged at its lower edge 50, and which may be lowered when necessary for the passage of a boat. It may be raised, as by a chain 51, operated from a power device, as a winch or winches 52, located on the wall at the side. This gate may be fitted within an opening of corresponding area and partially closed to increase velocity, or it may be entirely closed within an opening of larger area.

As a further means of preventing an upward flow of salty water along the bottom, I may provide a wall, as 53, beneath the gate and provide an opening or a by-pass, as 54, which may be either a hole or a pipe, through which water will flow downstream, this flow being assured sufficient velocity by closing the available channel until such is attained. Such gates as these may be used in channels where no locks occur, to prevent salty water from working upstream. The style of construction of these gates and the manner of operating them may be widely varied. Also the pockets or sumps may be used in combination with gates, or they may be used separately. Thus, by this means, which enables drawing the waste water from the lower levels or strata of the upper channel, by reducing the cross section of said upper channel sufficiently to produce an increased velocity of flow, or both, the upstream flow of salt water may be prevented. In certain cases this may be of great importance, as for instance, where a body of water is connected rather closely with the sea or salt water, it being desirable to maintain such body of water in fresh condition, for the advantages inherent in such condition for harbor purposes, steaming and domestic uses.

In salt water, teredos are very destructive of all wooden wharf structures and foundations, while in fresh water, such wooden structures will last an indefinite time. There is also the advantage of the cleaning effect which fresh water has upon the hulls of barnacle laden ships. Aside from other advantages it is therefore of importance for these reasons as well to maintain the fresh character of harbors so situated.

In further explanation of this invention and the principles involved therein, the following is given: If tide water is connected with a fresh water canal by a lock of ordinary construction, with bottom of channel above the lock at the approximate level of the sill of the upper lock, salt water will be carried upstream by the operation of the lock. If, however, a lock is built with a series of sumps located in the flow channel above the lock, with bottoms extended well below the normal level of the canal bed, and having capacity as great as the lock, and connected to discharge, near their bottoms, into the lower level, with proper control, salt water can be prevented from ascending the stream beyond said sumps. The reason for this is as follows: The entire flow of the stream, with exception of water required to operate lock, will flow downward through the sumps, discharging therefrom, first, the salt or brackish water, before any fresh water is discharged. Since the capacity of the lock is limited, the sumps will entirely take care of any water of higher specific gravity than fresh water. Thus, it requires only that the water in the sumps be drawn off fast enough and all salt will be eliminated. If a partition, as 4, (Figs. 1 and 2) be placed between the sumps, to act as a baffle plate, the upward flow of salt water along bottom of stream will be retarded, thus allowing increased time for drawing off the brackish water. If, further, it should happen that the supply of fresh water flowing down the stream was insufficient for the purpose and brackish water should become diffused beyond these sumps, I have provided control gates 5, and by-passes 54, (Figs. 1, 2 and 5) to reduce the cross section of the channel, particularly its vertical cross section, until velocity is sufficiently increased to prevent salt water from progressing upstream. These gates being operable to permit passage of boats.

In case of freshet flows of greater volume than could be discharged through the by-passes, the control gates will be raised only high enough to produce a combined flow, over the top thereof and through the by-passes, of sufficient velocity to resist the upward flow of salt water. The adjusted gates, in this instance, would operate as auxiliaries to the by-passes. The object of the sumps, the baffle plate and the control gates is to so retard the flow of salt water upstream as to allow time for its drawing off before it has become too generally diffused, enormously increasing the amount of water required to be drawn off in order to get rid of it. However, with a lock of ordinary construction, the following results would be obtained: If it is in connection with a spillway, the spillway will draw off the top or freshest water. Experience has shown that a surface spillway will not draw off salt water. The lock, when opening to release a boat to the higher level, will discharge along the bottom of channel its full capacity of salt or brackish water, which will have no means of escape except as it may be diffused with the surface water of the canal above the lock, when it will be only partially discharged therewith. No water will be taken from the upper canal level for lock purposes until the lock is again operated from the lower level, which may be a considerable period. This gives the salt water at bottom of channel ample opportunity to spread out a long distance up the canal. When, moreover, the lock is filled for raising the next boat, the water required will be taken so rapidly that only such brackish water as may lie in the immediate vicinity will be included in the volume used. The reason for this is that the depth of the salt water at the bottom of the channel has decreased as a result of spreading out along the bottom of the canal.

In the dry season, when there is but relatively little water flowing down the stream, the number of boats passing through the lock will continue the same, although the quantity of water available for keeping the canal fresh above the lock will be very materially reduced. Under these conditions, my salt preventing mechanism will be operated as follows: Control gates 5, above the lock, will be closed. All valves 31, with exception of the one nearest the lock, will be closed. Salt water, discharged as usual when upper lock gate is opened, will flow into the first and second sumps, 6—6, (Figs. 1 and 2), but will be prevented from flowing beyond the first gate 5, which will be placed at considerable distance, say one-quarter of a mile, above the upper lock gate. When boat has approached said first gate 5, the gate will drop to allow it to pass into the canal section beyond and will then close. In the mean time some brackish water will have escaped through this gate, but will be caught in the sump formed above it and partially drawn off through the by-pass openings, 54, 54, beneath the gate, thence working out toward the open valve 31. The boat will proceed toward the second gate 5, placed say, another one-quarter of a mile upstream, which will open upon its approach and then close immediately when it has passed, with results as at the first gate 5. While the first gate 5 may allow considerable salt water to pass, the second gate 5, being exposed to a less volume than was the first gate, will pass a relatively less volume, with a similar diminution at each succeeding gate.

Having thus described my invention, what I claim as new, and desire to secure by Letters Patent of the United States of America, is:

1. The combination with a canal lock and means for filling the lock chamber, of a sump located in the flow channel upstream from the said lock and consisting of an area whose bottom is extended well below the normal level of the canal bed above the lock, and a waste channel, having its intake located to separate and discharge from said sump the waters of higher specific gravity.

2. The combination, in a canal, of a canal lock, a lock filling conduit or channel, adapted to take its supply upstream from said lock, supply connections from said channel to the lock chamber, and means for separating and discharging, around the lock, the canal waters of highest relative specific gravity.

3. The combination with a canal lock of a sump located in the channel upstream from and adjacent the lock, a waste conduit or channel drawing water from the lower levels of the sump, and a lock filling conduit or channel independent of said waste channel and extending to and having its supply connection with the upper levels of the canal, upstream from the sump.

4. The combination with a canal lock of a sump located above the lock chamber and having a bottom level materially lower than the upstream lock sill, means for drawing off water from the bottom strata of said sump, said means terminating at its discharge end in a weir which extends to near the water level and means for filling the lock chamber with water taken from the upper levels of the canal above the lock.

5. The combination with a canal lock of a series of sumps placed in succession in the canal bed above the lock, means for drawing waste water from whatever sump or combination of sumps may be desired, and means for filling the lock chamber with water drawn from the upper levels of the canal upstream from the lock.

6. In combination with a canal lock and means for filling the lock chamber, a waste weir or spillway and means for separating and feeding to the said spillway waters drawn from the lower levels of the canal above the lock.

7. In combination with a canal lock, adapted for use between a body of salt water and a body of fresh water, means for drawing off and discharging water from a lower level in said lock and means for simultaneously drawing water from the upper levels of the canal above the lock and discharging same into the lock at a relatively high level.

8. In a canal lock, adapted for use between a body of salt water and a body of fresh water, means for drawing off from said lock and discharging first the water of highest relative specific gravity, and means for simultaneously admitting into the said lock water of a lower relative specific gravity.

9. The combination with a canal lock, of a series of sumps placed in succession in the canal bed above the lock, and means for drawing waste water from whatever sump or combination of sumps may be desired, and separate means for drawing water from the upper levels of the canal upstream from the sumps and discharging same into the lock.

10. The combination with a canal lock, of a sump located in the flow channel upstream from the lock and consisting of an area whose bottom is extended well below the normal level of the canal bed above the lock, a waste conduit or channel adapted for drawing water from the lower levels of said sump, and means, independent of said waste channel, for filling the lock.

11. In a canal lock, adapted for use between a body of salt water and a body of fresh water, means for drawing off from said lock and discharging first the water of highest specific gravity and a supply means adapted to admit to the said lock, at a relatively higher level, water of a lower relative specific gravity.

12. The combination with a canal and a lock therein connecting sections of different level, of means for separating the waters of different specific gravity in the upper level, means for discharging the waters of greater density around the lock and means for filling the lock from the waters of lesser density.

13. The combination with a canal lock and means for filling the lock chamber, of a sump located in the flow channel upstream from the lock and consisting of an area whose bottom is extended well below the normal level of the canal bed above the lock, a water discharge channel, adapted exclusively for drawing water from the sump at a relatively low level, said water discharge channel terminating in a spillway located at a relatively high level, and means for controlling the flow within the said channel.

14. In combination with a canal lock, adapted for use between a body of salt water and a body of fresh water, means for filling the lock chamber and means for preventing the flow of salt water upstream from the lock, consisting of a baffle plate placed to extend across the channel bed.

15. In combination with a canal lock, adapted for use between a body of salt water and a body of fresh water, means for filling the lock chamber and means for preventing the flow of salt water upstream from the lock, consisting of current checking constructions placed in the bed of the stream.

16. In combination with a canal lock, adapted for use between a body of salt water and a body of fresh water, means for filling the lock chamber and means for preventing the flow of salt water upstream from the lock, consisting of obstructions for checking the flow of water along the stream bed while leaving the surface layers of the water free to flow.

17. In combination with a canal lock, adapted for use between a body of salt water and a body of fresh water, means for filling the lock chamber and means for preventing the flow of salt water upstream from the lock, consisting of an adjustable obstruction capable of adjustment to restrict the section available for flow.

18. In combination with a canal lock, adapted for use between a body of salt water and a body of fresh water, means for filling the lock chamber and means for preventing the flow of salt water upstream from the lock, consisting of a by-pass and a gate for maintaining an accelerated flow of water through the said by-pass.

19. In combination with a canal lock, adapted for use between a body of salt water and a body of fresh water, means for filling the lock chamber and means for preventing the flow of salt water upstream from the lock, consisting of a fixed structure placed across the channel, to limit the flow area to a definite section, an adjustable gate adapted to substantially close this section and a by-pass.

Signed at Seattle, Washington, this 10th day of February, 1915.

WILLIAM M. MEACHAM.

Witnesses:
 HENRY L. REYNOLDS,
 JAMES E. SPROLL.